(12) United States Patent
Kumar

(10) Patent No.: US 9,811,328 B2
(45) Date of Patent: *Nov. 7, 2017

(54) AUTOMATIC DISCOVERY AND RETRIEVAL OF INTEROPERABLE APPLICATIONS

(71) Applicant: Google Inc., Mountain View, CA (US)

(72) Inventor: Atul Kumar, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,062

(22) Filed: Sep. 26, 2016

(65) Prior Publication Data

US 2017/0010876 A1    Jan. 12, 2017

Related U.S. Application Data

(63) Continuation of application No. 14/568,247, filed on Dec. 12, 2014, now Pat. No. 9,454,354.

(Continued)

(51) Int. Cl.
*G06F 9/445*     (2006.01)
*H04L 29/08*     (2006.01)
(Continued)

(52) U.S. Cl.
CPC .............. *G06F 8/61* (2013.01); *G06F 3/0488* (2013.01); *G06F 3/04817* (2013.01);
(Continued)

(58) Field of Classification Search
CPC .......... G06F 8/61; G06F 8/62; G06F 3/04842; G06F 3/04817; G06F 3/0488; G06F 3/0482; G06F 21/53; H04L 21/53
(Continued)

(56) References Cited

U.S. PATENT DOCUMENTS 5,421,012 A  *  5/1995  Khoyi .................. G06F 8/76
                                                 715/700
6,738,766 B2     5/2004  Peng
(Continued)

FOREIGN PATENT DOCUMENTS

WO         2012057876 A1     5/2012

OTHER PUBLICATIONS

Biersdorfer, "iPad—the missing manual—6th edition", Dec. 2, 2013, p. 3.
(Continued)

*Primary Examiner* — Anna Deng
(74) *Attorney, Agent, or Firm* — Morris & Kamlay LLP

(57) ABSTRACT

The disclosed implementations provide a seamless mechanism for end users to discover and try out new and/or updated applications. An application store may determine alternative applications to a frequently used first application on the client device that are similar to the first application. It may provide installation packages to the client device that installs the applications in a manner that associates the alternative applications with the first application. A notice may be generated by the client device that indicates the applications have been installed and/or that the data generated by the first application has been imported into the alternative applications. A selection of a user interface element may launch one of the alternative applications. Data generated by the first application may be displayed according to the user interface of the alternative application.

19 Claims, 12 Drawing Sheets

Related U.S. Application Data

(60) Provisional application No. 62/089,641, filed on Dec. 9, 2014.

(51) Int. Cl.
  *G06F 3/0484* (2013.01)
  *G06F 3/0481* (2013.01)
  *G06F 3/0488* (2013.01)
  G06F 21/53 (2013.01)
  G06F 3/0482 (2013.01)

(52) U.S. Cl.
  CPC .......... *G06F 3/04842* (2013.01); *H04L 67/10* (2013.01); *G06F 3/0482* (2013.01); *G06F 3/04883* (2013.01); *G06F 8/62* (2013.01); *G06F 21/53* (2013.01)

(58) Field of Classification Search
  USPC .................................................. 717/174–177
  See application file for complete search history.

(56) References Cited

U.S. PATENT DOCUMENTS

| | | |
|---|---|---|
| 8,583,030 B2 | 11/2013 | Rao |
| 2008/0153456 A1 | 6/2008 | Wen |
| 2012/0021774 A1 | 1/2012 | Mehta |
| 2013/0103550 A1* | 4/2013 | Nygaard ................ G06Q 30/00 705/27.1 |
| 2013/0127708 A1 | 5/2013 | Jung et al. |
| 2013/0167143 A1 | 6/2013 | Yi |
| 2013/0198029 A1 | 8/2013 | Mowatt et al. |
| 2014/0215457 A1 | 7/2014 | Gava |
| 2014/0282245 A1 | 9/2014 | Scarborough |

OTHER PUBLICATIONS

PCT/US2015/59459, International Search Report and Written Opinion issued in PCT/US2015/59459 dated Feb. 22, 2016., Feb. 22, 2016, 13.

IPRP dated Jun. 22, 2017 as received in Application No. PCT/US2015/059459.

* cited by examiner

AUTOMATIC DISCOVERY AND RETRIEVAL OF INTEROPERABLE APPLICATIONS

CROSS REFERENCE TO RELATED APPLICATION

This application claims priority to provisional application No. 62/089,641, filed on Dec. 9, 2014, the disclosure of which is hereby incorporated by reference in its entirety.

BACKGROUND

Many users have a smartphone and/or tablet that utilizes applications that are hosted by an application store. The application store may host a variety of content such as applications, music, movies, and electronic books. The content may be provided to a client-computing device belonging to an end user. The number of applications available on an application store may number in the millions with potentially thousands of new applications or updated applications publishing daily. Most users, however, typically have only a handful of installed applications that they use regularly. Installed applications may refer to those applications that a user elected to install on the user's computing device as compared to those applications that were already installed on the stock device when the user purchased it (e.g., operating system applications, manufacturer applications, mobile or wireless provider applications, etc.).

A user who has installed an application on a client device may not attempt to test other applications that may better suit the user's needs because continuously searching for a different application can be difficult and time consuming. For example, the user may not be informed when a new application is available. Further, the user may be reluctant to test other applications because the user's data is associated with the already-installed application. Further, it may be difficult for the user to locate and/or determine which alternative applications to try out.

An application store or third party typically attempts to address the above-mentioned issues by generating recommendation charts (e.g., a top 10 list, most popular ranking, similar applications, etc.) that can be personalized based on an end user. Such techniques may not be effective because a user may not locate the optimal alternative application among the recommended list. For example, the user may test only the first few applications on a top 10 list and, after not finding the desired feature in one of those few applications, abandon the search for an alternative application. The user also may determine, based on this brief trial, that no alternative application contains the feature the user desires and permanently abandon the search therefore.

BRIEF SUMMARY

According to an implementation of the disclosed subject matter, applications may be determined to belong to a category of applications to which a first application belongs. The first application may be determined to be frequently used on a client device. The data generated by the first application may be in a format that is interoperable with the applications based on the category. An installation package may be sent for each of the applications to the client device that directs the client device to automatically install each of the applications. An indication may be provided to the client device that the applications have been installed. The client device may present a notice that the applications are available to a user of the client device. The notice may be associated with the first application.

In an implementation, installation packages may be received from an application store. The installation packages may correspond to a group of applications that belong to a category of applications to which a first application installed on a client device belongs. The first application may be determined to be frequently used by the client device. The applications may be installed on the client device. A notice on the client device may be generated that indicates the applications have been installed. A selection of a user interface element may be received that launches one of the applications that have been installed. Subsequent to the selection of the first user interface element, data generated by the first application may be displayed according to a user interface of the application that has been launched.

A system is disclosed that includes a client device that has a computer readable storage medium and a processor. The storage medium may be configured to store user data and application data. The processor may be communicatively coupled to the storage medium. It may be configured to receive installation packages corresponding to applications that belong to a category of applications to which a first application installed on the client device belongs. The first application may be determined to be frequently used by the client device. The applications may be installed on the client device. A notice may be generated on the client device that indicates the applications have been installed. A selection of a first user interface element may be received that launches one of the applications. Subsequent to selection of the first user interface element, data generated by the first application may be displayed according to a user interface of the launched one of the applications.

As disclosed herein, a client device may receive installation packages for applications (e.g., alternative applications) that belong to the same category as a frequently used first application. The client device may install the alternative applications. A notice may be generated on the client device that indicates the alternative applications have been installed. A selection of a first user interface element may be received that may display a graphical representation of the alternative applications. A selection of one or more second user interface elements may be received that launches one of alternative applications. Subsequent to the selection of the one or more second user interface elements, data generated by the first application may be displayed according to a user interface of the launched alternative application.

In an implementation, a system according to the presently disclosed subject matter may include a means for receiving, from an application store, installation packages corresponding to applications that belong to a category of applications to which a first application installed on a client device belongs. The first application may be determined to be frequently used by the client device. The system may include a means for installing the applications on the client device. The system may include a means for generating a notice on the client device that indicates the applications have been installed. The system may include a means for receiving a selection of a user interface element that launches one of the applications. Subsequent to the selection of the first user interface element, the system may include a means for displaying data generated by the first application according to a user interface of the launched application.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
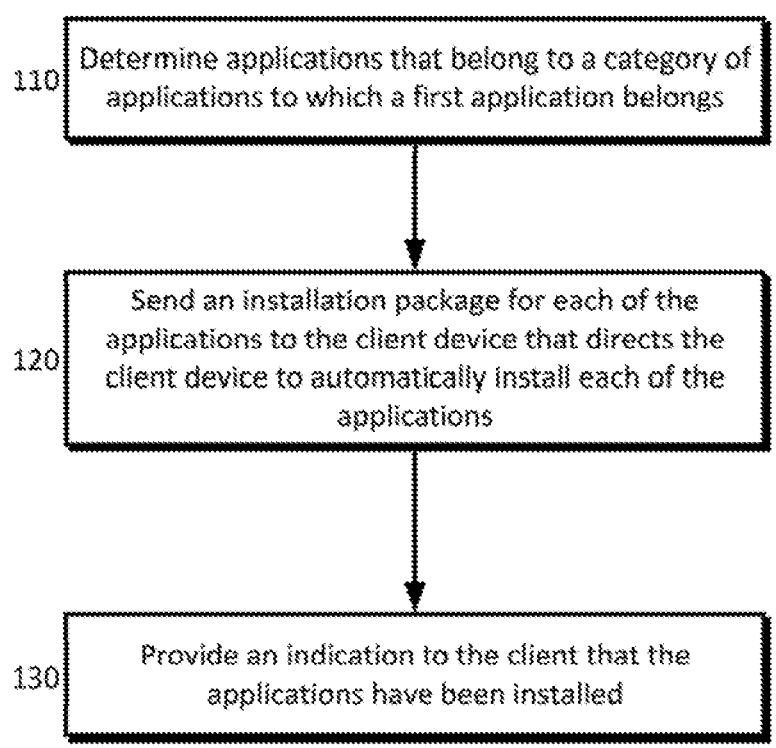
FIG. 1 is an example of a process performed by an application store or the like to automatically install applications on a client device that are related to an application installed on a client device according to an implementation disclosed herein.

Implementations disclosed herein provide an application ecosystem that can enable end users to locate new and/or updated applications that are not currently installed on the end user's computing device. The disclosed implementations prevent a user from becoming locked into a particular application and allow users to test out new applications or alternative applications seamlessly from the user's computing device without having to search, review, and download the alternative or recommended applications. While most users typically visit or regularly use few applications on a mobile device (e.g., a tablet, a laptop, a smartphone), the process of searching for alternative applications to locate a feature that a current application is missing can be a taxing process. That process may require a user to search for the desired application and/or feature, read reviews/ratings, download and install the application on the user's computing device, evaluate the new application, remove the old application if the new application is suitable for the user. In some cases, the user may not be able to import the data generated by the old application, which may make the user more reluctant to switch applications.

As an illustrative example, a cycling enthusiast may have a first application called "Cat 6 Stig" that collects data on the user's bicycling. It may store statistics or data regarding the user's miles, speed, and routes. Six months after installing Cat 6 Stig the user may desire to have an advanced feature such as a graphical representation of the user's progress (e.g., total kilometers cycled or climbed) or the wattage the user outputs while cycling. These advanced features may not be present in Cat 6 Stig. The aforementioned issues arise in that unless the user constantly checks applications in the cycling category, the user may not be aware that a newer or recently updated application offers the advanced features. In some instances, the user may search an application store for alternative applications with these advanced features, but the alternative applications may not be published at that time and the user may abandon the search for an alternative application. For example, a new cycling application "Le Velo" may publish a month after the user searches the application store and it may contain the advanced features the user seeks. Unless the user periodically and continually searches for alternative applications on the application store, the user is locked into an application that provides a suboptimal experience because of search fatigue.

Continuing the example, even if the user locates Le Velo on the application store, the user may be "locked" into using Cat 6 Stig, because the all of the user's cycling data have been generated, curated, and/or maintained by Cat 6 Stig and/or may be incompatible with Le Velo (e.g., the data can't be imported or read by Le Velo). The substantial effort required by the user to move the data manually to Le Velo may dissuade the user from using Le Velo and continue using a suboptimal application.

The user also may not desire to download multiple cycling applications to attempt to find a superior application for the user, Le Velo. Many users may be reluctant to expend the time required to locate the alternative applications. Further, downloading the applications may associate the applications with the user's account on the application store. In some cases, the downloaded alternative applications may be propagated to other devices associated with the user's account, which may clutter those devices. Further, the user may not wish to clutter the device on which Cat 6 Stig is located.

The above illustration is similarly found in many other types of applications. For example, managing a stock portfolio or finance applications, travel applications, event management applications, bill management/payment applications, photography applications, cooking applications, video game applications (e.g., jigsaw puzzle applications, slot machine applications, etc.), and the like.

The disclosed implementations provide auto-discovery of alternative applications and an option to install quickly new or improved applications. Further, an interoperable framework is disclose that allows end users to transfer easily data between a set of similarly tasked applications or applications that belong to the same category or sub-category of applications. Lastly, the alternative applications can be presented to the end user in an elegant user interface to prevent the user from becoming disinterested in trying out new applications and/or to avoid distracting the user from routine use of the primary application or the device.

As stated earlier, many users typically utilize only a handful of applications on a given device. The most frequently used applications can be determined, as disclosed in further detail below. The system may generate a set of alternative applications, including new or recently improved applications, which are related to one of the frequently used applications by the user. The set of applications may be generated in a background process that does not require direct input from, or interaction with the user, thus reducing the effort required from the user to identify related applications. The alternative applications may be determined based on a variety of factors. A non-exhaustive list may include a popularity metric, a rating, a sentiment rating, installation velocity, application publishing date, application retention, application similarity, user similarity, etc.

A sandboxed environment may be provided that allows a "lite" or trial/demo version of an application to be installed with a minimum number of user interaction. For example, the user may be presented with an "install all" option. Trial versions may be limited by time or functionality by a developer or by the application store. For example, the user may be permitted to play only a limited number of levels of a game. The system may provide functionality, as described below, that permits users to try or test the alternative applications using the user's existing data generated by one of the most frequently used applications on the user's device. Similarly, a mechanism to remove or uninstall the set of applications with a minimal amount of user interaction is also provided. For example, the system may provide "stick with the primary application" and/or "remove all alternative applications" options via a user interface on the user's computing device. Thus, the disclosed system may reduce or eliminate the need for the user to search for alternative applications one by one on an ad hoc basis thereby saving the user time and hardship involved in searching for new applications.

In an implementation, data may be transferred between the set of alternative applications and the primary application that already is installed on the user's computing device. A series of reference files for various categories of applications may be created to permit a uniform framework for similar applications and interoperability between application data. For example, a cycling application's reference file (e.g., the data file generated by the application) may include attributes such as distance, route, start time, end time, etc. Applications in the cycling category may be required to provide similarly functionality to input, save, and/or export the attributes. Import/export of data may be performed with the user's permission. The reference file can be exported by the primary application (e.g., to a cloud-based system or to a storage medium on the computing device). The reference file may be flexible or be able to contain data entries or objects for other classes of variable (e.g., watts for the cycling application). Thus, a user may be liberated from an application with respect to the data generated by a particular application.

The user interface provided on the user's computing device can be unobtrusive. In some instances, a user may not wish to receive recommendations or suggestions of alternative applications as disclosed herein. The implementations disclosed herein may be activated only with the user's permission. Similarly, a user may deactivate the features after activating them.

The user interface, as will be described in further detail below, may include a visual indication of availability of the alternative applications for the primary applications. For example, the icon of the primary application may show a number to indicate that alternative applications are ready to be evaluated by the user. The number may correspond to the number of alternative applications available. The transparency of the application or icon for the primary application may change to indicate that there are alternative applications available. Thus, the group of applications may be revealed without cluttering the user interface of the user's computing device. A user may switch between the alternative applications by swiping, for example, in one direction to move to the next alternative application. The system may bulk install the alternative applications and similarly uninstall applications (including the primary application) at the direction of the user.

FIG. 1 is illustrative of a process to automatically install applications on a client device that are related to an application installed on a client device. The process may be implemented by suitable computer hardware associated with an application store. The application store may include a collection of servers and/or processors that host applications and/or content. The application store may refer to multiple clusters of servers and/or databases located at geographically distinct regions. Users may interact with the application store through an application operating on the client device such as a web browser or a stand-alone application. The application store may present applications according to popularity, rating, category, etc. A user may have a user account through which the user may make purchases of content and/or applications hosted by the application store and/or in-application items. Similarly, the application store may store an indication of which applications and/or items are installed on a particular client device. Further, a given user may have more than one client device and the application store may determine the applications/items associated with each specific device. Similarly, the application store may determine the device from which the user is interacting with the application store based on a device identifier received, for example, through a web browser request to the store.

At 110, applications may be determined to belong to a category of applications to which a first application belongs. For example, when a developer publishes an application to the application store, the developer may be required to select a category for the application (e.g., word processing, utility, game, web, etc.). An application category may have a sub-category. For example, the category of "games" may have sub-categories such as first person shooter, puzzle, role-playing game, strategy, and racing. In situations where the category is large and has multiple subcategories, the category at 110 may refer to a sub-category.

The first application may be installed on a client device that is associated with a user such as by a user account. The client device may provide, with a user's permission, usage data regarding the applications installed on the client device to the application store or a server connected thereto. For example, it may indicate the number of instances per day that an application was launched and/or the length of time each application was active per day. The application store or server connected thereto may determine the applications that are frequently used by the user on the client device. For example, the applications may be ranked based on the total time used and/or the number of launches over a specified period of time. A frequently used application may refer to an application that is activated and/or used by the user more often than a majority of other applications. In some configurations, a frequently used application may correspond to applications that are within the top 30% of all applications that were installed at the request of the user on the client device with respect to the number of launches and/or amount of active time on the client device. In some configurations, a frequently used application may correspond to applications that are within the top 10% of all applications that were installed at the request of the user on the client device with respect to the number of launches and/or amount of active time on the client device. Applications deemed to be frequently used may be considered the "most frequently used" applications on the client device.

The system may determine the threshold based on a specific user's use data for the applications. For example, if a user has installed ten applications on the client device, the application store may store an indication that each of the ten applications has been downloaded by the user. The application store may expect to receive usage data for the ten applications from the client device periodically. The usage data may indicate that the user launches six of the applications five or more times per day and the other four applications less than once a day. The system may perform a clustering analysis on the usage data or otherwise algorithmically determine that there are two clusters of applications based on the usage. Examples of clustering techniques may include hierarchical clustering, k-means clustering, and density based clustering. Other algorithmic techniques may be employed to determine where a difference in groups of data exist such as by classifying the data according to a machine-learning algorithm.

The system may perform the process illustrated in FIG. 1 on the group of six applications because they are more frequently used relative to the group of four applications in this case. A different user may have ten applications installed on the client device. A clustering analysis performed by the server based on the usage data for the ten applications may indicate that there are three clusters. One cluster, consisting of three applications, may be associated with at least one hour of activity per day. A second cluster, consisting of four applications, may be associated with between ten minutes and fifteen minutes of activity per day. A third cluster may be associated with less than one minute of activity per day. The system may select the first cluster for the process shown in FIG. 1 because it represents the most frequently used applications by this particular user.

Thus, an application, such as the first application in FIG. 1, may be determined to be frequently used and/or among a group of applications installed on a client device that are the most frequently used. Data regarding the category and/or sub-category may be provided by a sentiment rating, installation velocity, application publishing date, application retention, application similarity, user similarity, and may be developer- or manually-curated in the application store database. At 110, upon determining one or more frequently used applications by the user on the client device, the system may determine applications in the category and/or subcategory of a frequently used application.

The system may be configured to select applications at 110 that have been published on the application store within a threshold period of time. For example, the threshold period of time may be six months. The system may determine which of the applications belonging to the same category and/or subcategory as the frequently used application have been published within that threshold period of time. In some configurations, the system may be programmed with a threshold period of time. In some configurations a user may indicate the threshold to use for the implementations disclosed herein. For example, when a user elects to use the services or implementations disclosed herein, the user may be prompted to enter a threshold period of time. An application publishing may refer to a new application on the application store. In some configurations, a publishing may refer to an updated version of an existing application being released. In such cases, because the installed user base is immediately higher because the application has been available for a longer period of time, the system may compute an application rating, a sentiment rating, a retention rate, etc. from the publishing of the update to present instead of considering the entire history of the application from when it was first published. Similarly, an installation velocity and number of installations may be excluded or mitigated because it is expected that most users who have the old version of the application will install, possibly automatically, the updated version. This may skew the installation velocity and installation values. The system may, instead, compute unique installations of the application after publishing of the update.

In addition to the date of publication or alternatively thereto, the system may select applications at 110 based upon a popularity metric, a user rating, an external rating, a retention rate, a sentiment rating, an installation velocity, an application similarity, and/or a user similarity. A popularity metric may refer to the number of installations on client devices for an application. As stated earlier, users may rate content and/or applications provided on the application store. The average of the ratings received may be displayed or represented on the application's page on the application store. Similarly, the application store may contact an external application rating service to obtain an external rating. It may combine the external rating with the user rating to arrive at a combined rating metric. A retention rate may refer to the number of instances in which a client device has installed and maintained the application. In some instances, it may refer to the inverse of the number of instances in which an application is uninstalled. For example, a retention rate may be computed as the ratio of uninstallations to the total number of unique installations, subtracted from 1 (i.e., 1—uninstallations/installations). An installation velocity may refer to the rate at which a new application is installed on client devices. It may be computed by the dividing the number of unique installations by a period of time (e.g., the threshold period of time from above, six months or 180 days). A sentiment rating may refer to how an application is being received. For example, a word analysis performed on user ratings may provide an indication of "good" (e.g., great, nice, easy, exactly, etc.) words and "bad" (e.g., stinks, bad, awful, etc.) words associated with the applications. The system may compute the ratio of "good" words to "bad" words to arrive at a sentiment rating. An application similarity may extend beyond the category of the application. It may be based on a variety of features specific for the application such as length of game, levels, complexity, etc. A user similarity may refer to users who have a similar group of applications, occupy a similar demographic (e.g., age, gender, location), etc.

Each of the aforementioned bases for selecting applications according to the process illustrated in FIG. 1 may be determined using the technique disclosed herein or by other computational techniques known to those having ordinary skill in the art. Further, a metric may be generated that combines each of these bases for selection. For example, the system may select only those applications that have published within the last six months, have a rating above four on a five-point scale, and have an installation velocity greater than 10,000 installations per day. The system may generate another list of the applications that satisfy these criteria and select a portion of the applications on the generated list. For example, it may select the top five applications on the list or another number of applications based upon a pre-determined value. A user may configure the number of applications selected from the list as well in some instances. For example, some users may prefer to receive ten applications at a time while another user may prefer only to receive three applications. The system may have a default value number of applications to select at 110 that is five or other pre-set value.

In an implementation, the system may determine whether a lite, demo, or trial version of an application exists (hereinafter referred to as a "lite" version). A lite version may be a version of the application that limits the functionality or features available to end users. For example, the lite version may only have a limited number of levels or allow a user to access only a select number of items available. The lite version may be provided by the developer of the application. Generally, it is in a developer's interest to highlight features of an application that will entice users to try out the application and/or retain the application. If a lite version of an application exists, the system may send the lite version's installation package at 120 instead of the full installation package.

The first application and the selected applications may read, write, and/or execute data in an interoperable format. The interoperable framework may be specific for a given category and/or subcategory of applications. The framework may be defined in any number of ways that are known to those of ordinary skill in the art. The foregoing examples are merely illustrative of interoperable frameworks that could be employed according to the disclosed implementations.

In an implementation, the framework may be characterized by basic information about the application stored, an indication of the category and/or subcategory, and data types. The data types may be pre-defined by the application store, for example, such that the application store and/or client devices understand that data objects, values, and/or variables listed or otherwise associated with the data type correspond to particular data type. As an example, Table 1 below shows various fields and a corresponding example of a value expected. The title, publisher, publish date, and size, category, and subcategory may be required fields for the application to be submitted to the application store by a developer. Further, in this example, the application provided by the developer must define the four data types required by the application as shown below. The first data type may be a variable or object in the application and correspond to speed. The units for any of the data fields may be set to a default system (e.g., metric). Similarly, there may be other data types defined by the developer that may not be compatible between applications such as data type 5 below. The user achievements within the Cat 6 Stig application may not be imported into other applications that follow the format defined by data types 1-4. The number of non-conforming data types (e.g., data type 5) may be unlimited. That is, an application may have a dozen non-conforming data types, but every application in the Cycling subcategory must have data types 1-4 (in addition to the basic data such as title, category, size, publisher, etc.). Similarly, the system may not allow a developer to submit speed as a non-conforming data type. Thus, data generated by any application must conform to the format defined by the system thereby easily enabling the system to import/export data between applications. It will be understood that the particular fields, number of conforming data types, and the like are provided as illustrative examples and that, more generally, any number of conforming data types, and/or specific data types, may be required.

TABLE 1

| Field | Value |
|---|---|
| <title> | Cat 6 Stig |
| <publisher> | MerxWerx |
| <publish date> | 17.06.2014 |
| <category> | Sports fitness |
| <subcategory> | Cycling |
| <size> | 8400 kb |
| <data type 1> | Speed |
| <data type 2> | Location |
| <data type 3> | Cadence |
| <data type 4> | Heart rate |
| <data type 5> | User achievements |

As another example of an interoperable framework compatible with implementations disclosed herein, the system may include two components. One component may include the basic information such as the name, category, subcategory, size, publisher, etc. as in Table 1. However, instead of defining data types by a preset format provided by the system (e.g., application store or server connected thereto), the developer may define objects and point to the indicated data objects as defined by the developer. For example, the system may expect to find data type 1 for speed in a cycling application. The application by the developer may provide an indication in the datasheet. The developer's application may contain code to indicate that the developer created object <SPEED> corresponds to <data type 1> or speed. A second application, Le Velo, may define <VELOCITY> as <data type 1>. Thus, the application may generate data in a format specific for the application (e.g., Cat 6 Stig), but when the system seeks to export the data to another application, it understands that values corresponding to <SPEED> in the developer's application may correspond to <VELOCITY> in a different application (e.g., Le Velo).

In an implementation, the framework may be entirely defined by the system. For example, the system may define objects, values, and/or variables that correspond to, for example, <SPEED>. A developer may utilize the system-provided objects, values, and/or variables when programming the application. In such a framework, certain applications may include, for example, data types 1-3 but not 4 whereas other applications may include data types 1-4. Still other applications may include data types that are not defined by the system (e.g., a data type 5 corresponding to watts). In situations where a developer elects not to utilize the provided framework for the pre-defined objects, the system may attempt to determine which variables correspond to the pre-defined objects. For example, the system may determine that values associated with a particular data type corresponds to speed based on the behavior of the value. Speed in a cycling application, for example, may be associated with particular units of measurement (e.g., km/hr) from which the system may infer that the value preceding such a unit of measurement corresponds to speed. Data may be imported/exported based on the determined data type.

Thus, a first application installed on a client device may generate data in a format that is compatible with other applications belonging to the same category as the first application. A compatible format may refer to the raw data being associated with a specific data type that is known to a different application. For example, values for speed in the first application may be exported from the first application and imported into a second application as speed values.

Returning to FIG. 1, an installation package for the applications determined and/or selected at 110 may be sent to the client device of a user at 120. The installation package, upon being received by the client device may cause the client device to install automatically the application associated with the package. In some configurations, the installation of the applications may be delayed to a period of inactivity on the client device (e.g., early in the morning such as 3:00 AM). The system (e.g., application store or server connected thereto) may determine five applications related to the first application that have published within the last six months and that have a high installation velocity (e.g. greater than 1,000 installations per day).

An installation package may refer to computer readable code that can be used to distribute and/or install an application and/or operating system. The installation package may be compiled by the application store upon upload of the application by the developer to the application store. The installation package may include the application's code, resources, assets, certificates, etc. The installation package may have a flag set that indicates to the client device to install that application in specific manner, at a specific time, retention time, and/or at a specific location in the computer readable storage of the client device. A retention time may indicate to the client device that, absent an instruction received form the user, the installed application should be removed or deleted from the client device. This may prevent the appearance of the client device's user interface from becoming cluttered. For example, the flag may set a five-day time limit for the application. If the user has not interacted with the installed application within that time, then the client device may remove the installed application.

In an implementation, the installation package may indicate that the applications are to be associated with the first application. The applications may not be linked to the user's account such that they may not be downloaded by other devices associated with the user's account. For example, if the client device is a user's smartphone and the applications related to the first application are downloaded to the smartphone, they may not be downloaded to the user's tablet that is also associated with the user's account.

The applications may be installed into a secure portion of the computer readable storage medium of the client device. The secure portion may prevent the application from having access to user data on stored on the device unless and until the user grants such permission to the applications and/or the user elects to keep one or more of the applications.

The installation packages sent at 120 may be handled differently by the client device than an application the user has specifically directed the application store to install on the client device. Typically, a user browses for an application on an application store using a web browser or stand-alone application, for example, and elects to install the application from an interface provided by the application store (e.g., in the web browser or stand-alone application). As disclosed herein, in contrast, the user is uninvolved with the applications downloaded at 120. For example, the user may have provided the initial permission for the client device and application store to share data and install the applications determined at 110 automatically. The user does not manually opt to install each application determined at 110. The user's interaction with the process illustrated in FIG. 1 may not be present until the user desires to view the installed applications via the user interface features disclosed herein. The installation packages may install the applications on the client devices and associate them with the first application installed on the client device.

At 130, an indication may be provided to the client device that the applications have been installed. An application may be considered installed when the application can be used by the user. For example, the user can launch the application from the user interface provided on the client device without having to download a subsequent installation package from the application store or external server. The installation of the applications may include importing data from the first application into the installed applications. The notice provided at 130 may be provided after importation of the data.

Figure 2A:
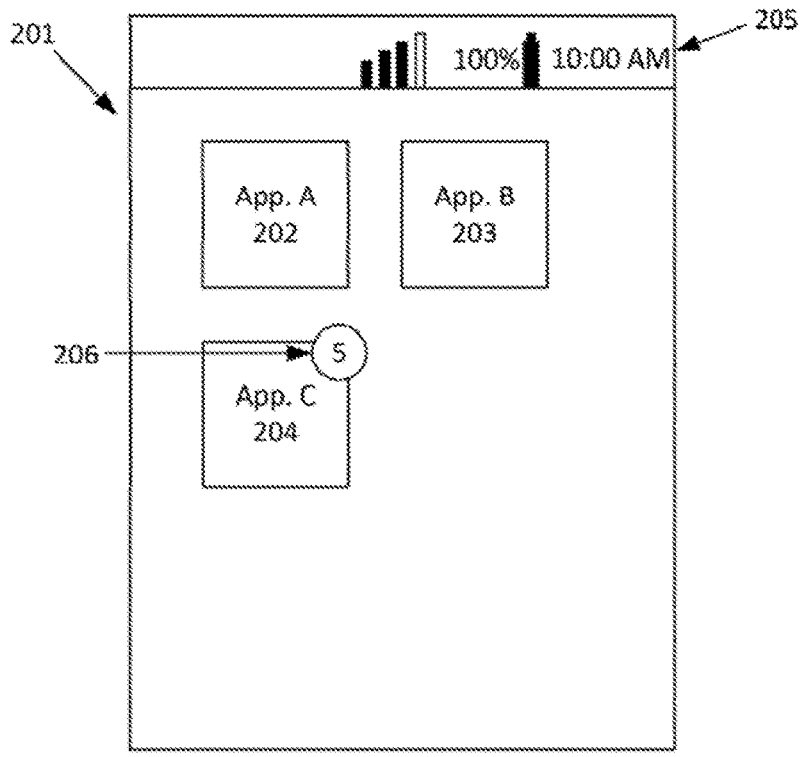
FIG. 2A is an example of a notice that may be provided to indicate that the applications have been installed on the client device as disclosed herein.

The installation package may contain a flag to indicate that the applications are to be associated with a particular application and utilize particular user interface elements or features on the client device as disclosed herein. FIG. 2A is an example of a notice that may be provided to indicate that the applications have been installed on the client device. FIG. 2A shows a client device 201 that may be a smartphone. The device 201 may display a status bar 205 that shows the current time, battery charge, a representation of a wireless signal strength, and other messages such as text and/or email messages. Three applications are shown corresponding to Application A 202, Application B 203, and Application C 204. On this screen of the client device 201, Application C 203 may have been determined, for example, by the client device or an application store server to be a frequently used application. The notice 206 to the user may correspond to a user interface element such as the five inside the circle as shown in FIG. 2A. The value shown in the notice 206 may correspond to the number of applications available for evaluation by the user that are related to Application C 206.

Figure 2B:
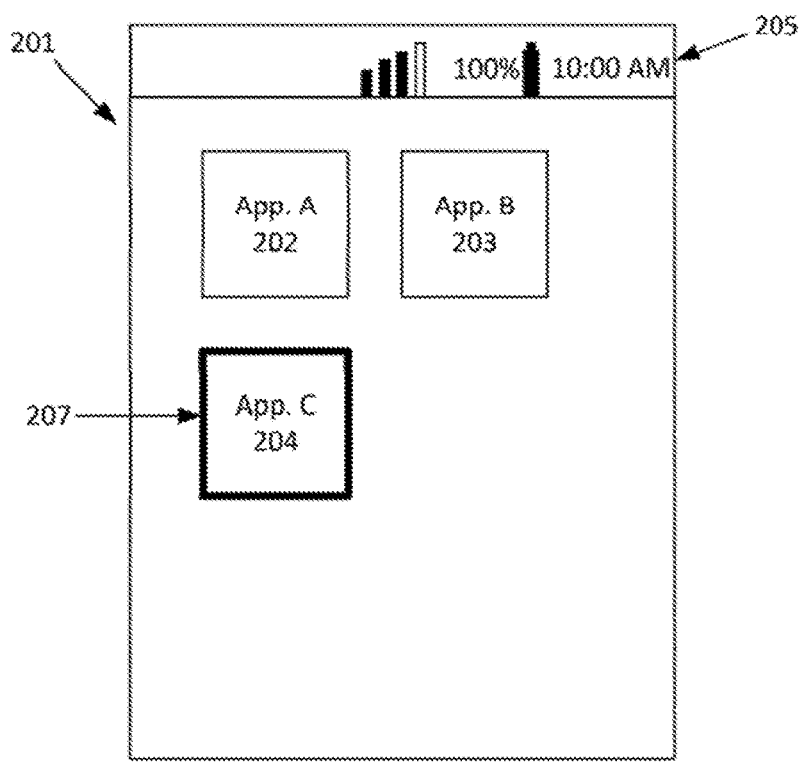
FIG. 2B shows an example of a notice in which the first application is highlighted by distinguishing the display of the icon for the first application relative to the icons representing the other applications as disclosed herein.
Figure 2C:
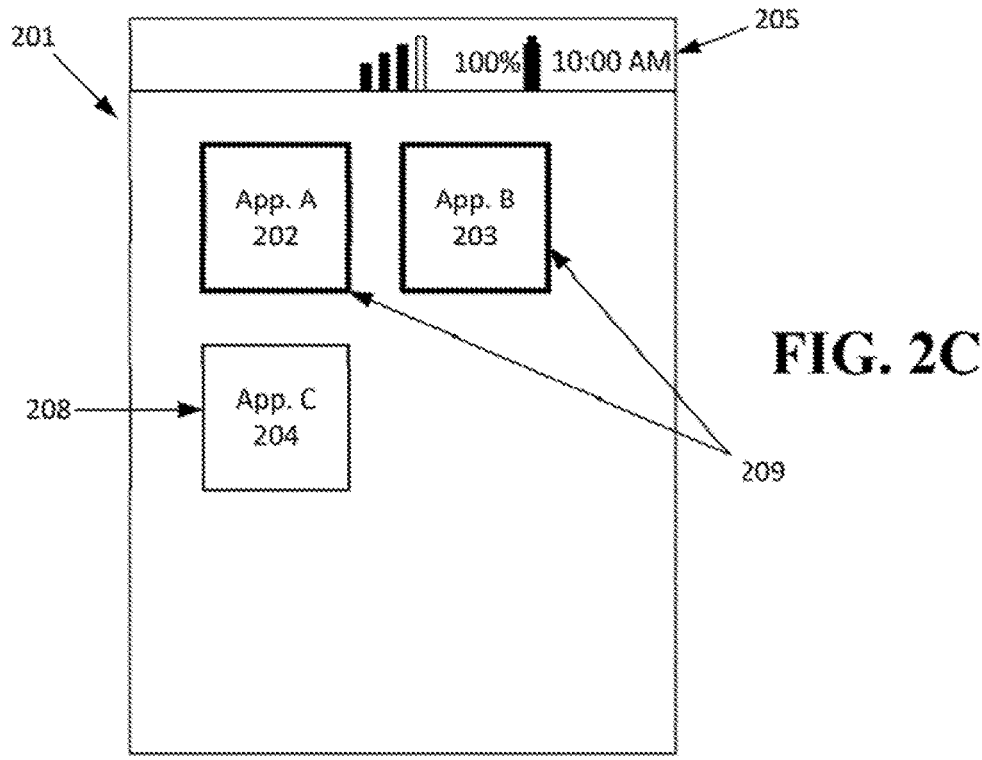
FIG. 2C is an example of a notice in which the icon representing a first application may be made slightly more transparent relative to the default icon display shown for other applications as disclosed herein.

FIG. 2B shows an example of a notice 207 in which the Application C 207 is highlighted by distinguishing the display of the icon for Application C 204 relative to the icons representing the other applications 202, 203. FIG. 2C is an example of a notice 208 in which the icon representing Application C 204 may be made slightly more transparent relative to the default icon display shown for other applications 202, 203. Other implementations of a notice or user interface elements may be utilized according to implementations disclosed herein. FIGS. 2A-C and 2G are merely illustrative of some user interface elements that can be used.

Figure 2D:
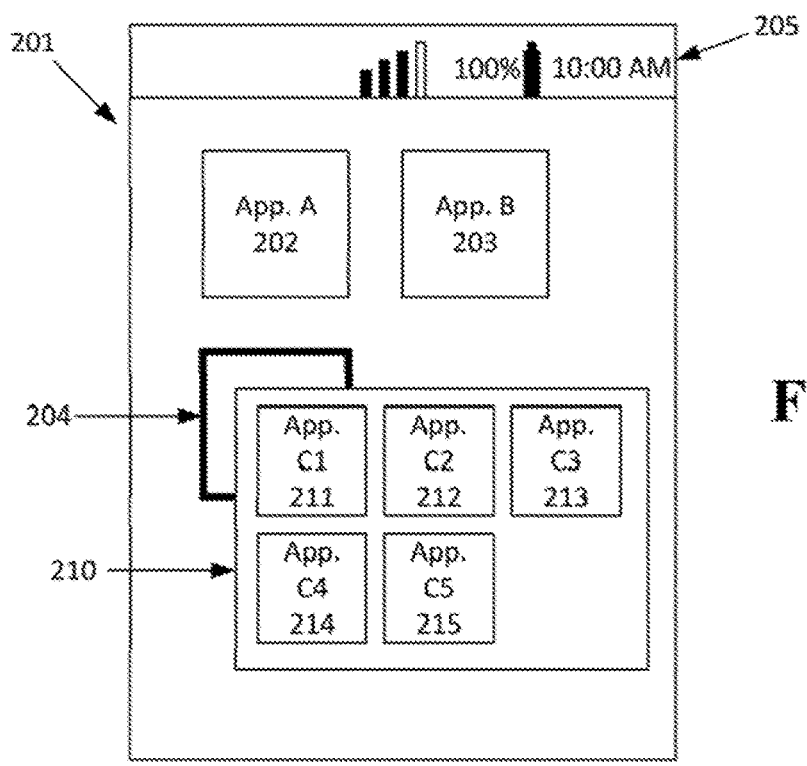
FIG. 2D is an example of a user interface element that corresponds to a folder-like display of alternative applications for the first application as disclosed herein.
Figure 2E:
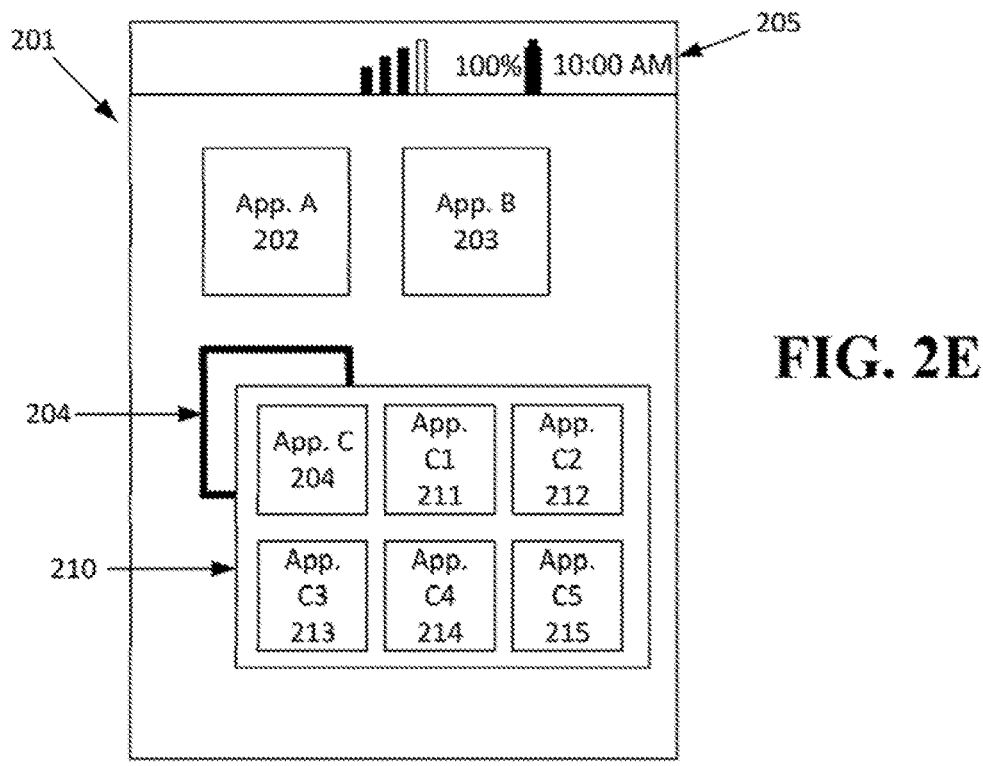
FIG. 2E is an example of a user interface element that corresponds to a folder-like display of alternative applications for the first application and user interface element contains the first application as disclosed herein.
Figure 2F:
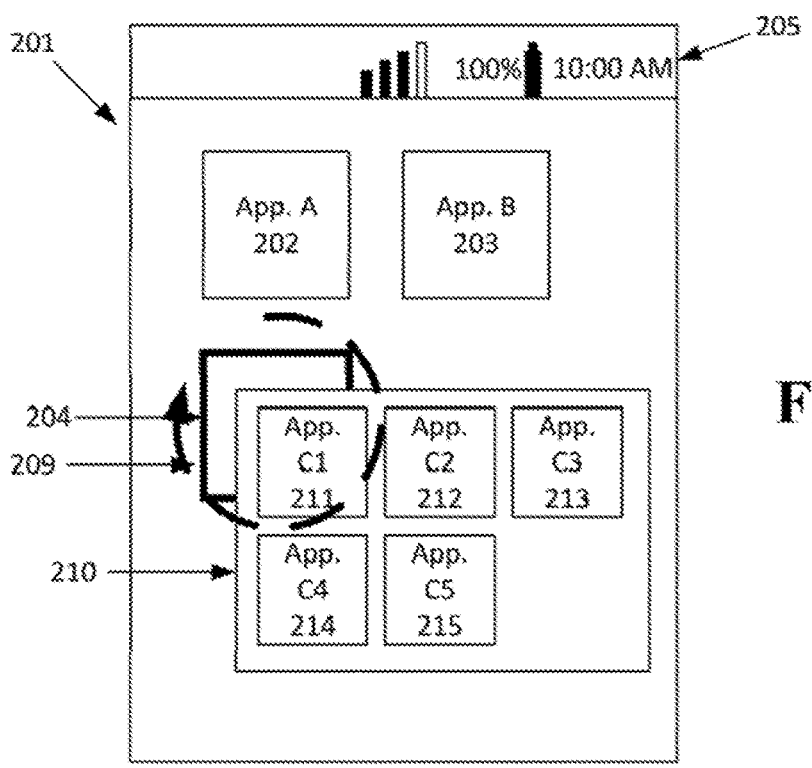
FIG. 2F is an example of gestural interaction with the user interface to cause the folder-like display element to appear on the client device as disclosed herein.

FIG. 2D is an example of how the installed applications may be interacted with by the end user. For example, a user may perform a long press or tap of the Application C 204 icon to reveal a folder-like display 210 that contains the alternative applications 211, 212, 213, 214, 215 to Application C 204. FIG. 2E is an example implementation of the folder-like display 204 in which Application C 204 is included in the folder 210 and can be selected by the user. In FIG. 2F, a user may perform a gesture 209 such as tracing a circle around the application to launch the folder-like display 210.

Figure 2G:
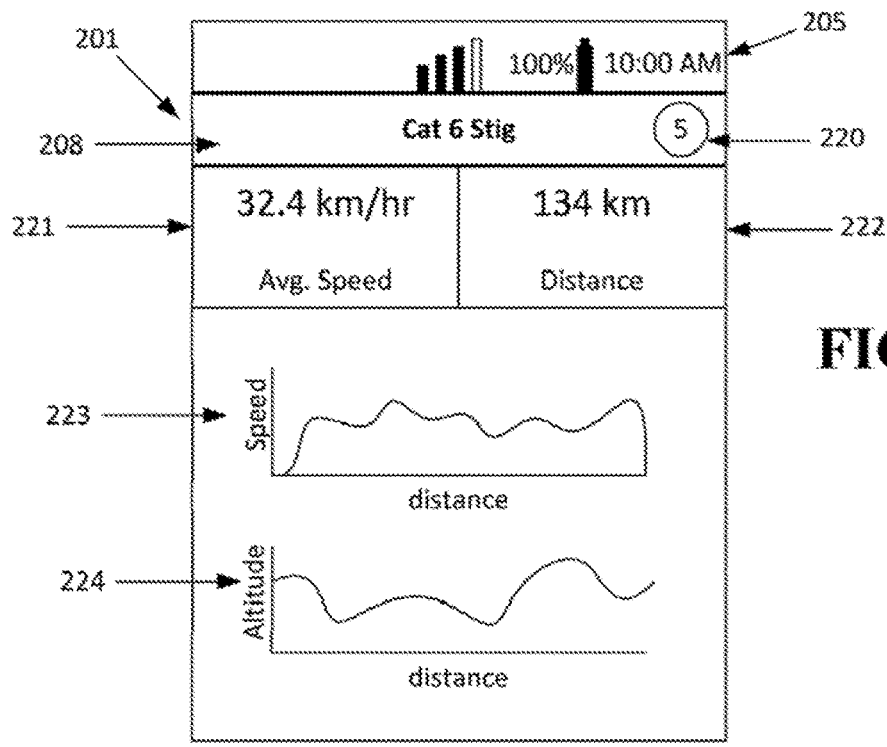
FIG. 2G is an example of an application (e.g., the first application) user interface that displays a notice in the title bar as disclosed herein.

FIG. 2G is an example of how the notice 220 may be provided from within the first application itself. For example, a user may launch the first application. The notice 220 may appear in the title bar 208 for the application and it may indicate the number of alternative applications available. FIG. 2G is an example user interface for the application Cat 6 Stig. The user interface may display the average speed 221, distance traveled 222, a graphical representation of speed over the distance traveled 223, and a graphical representation of the amount of climbing over the distance traveled 224.

Figure 2H:
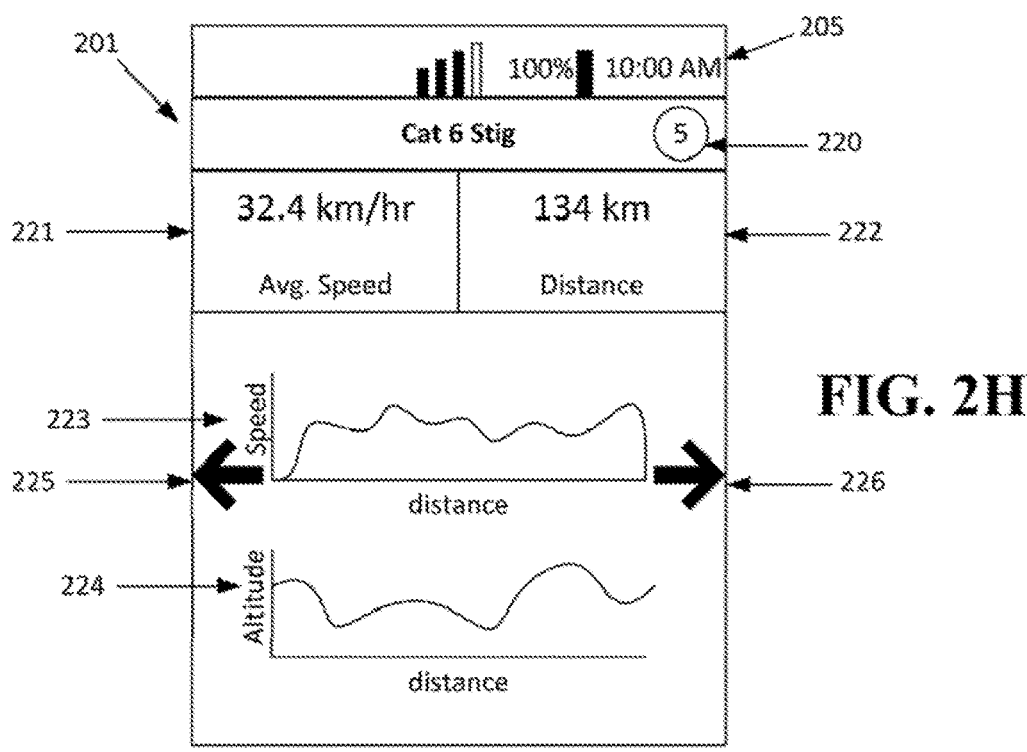
FIG. 2H is an example of a user interface element that may be utilized to navigate the alternative applications available and/or the first application as disclosed herein.
Figure 2I:
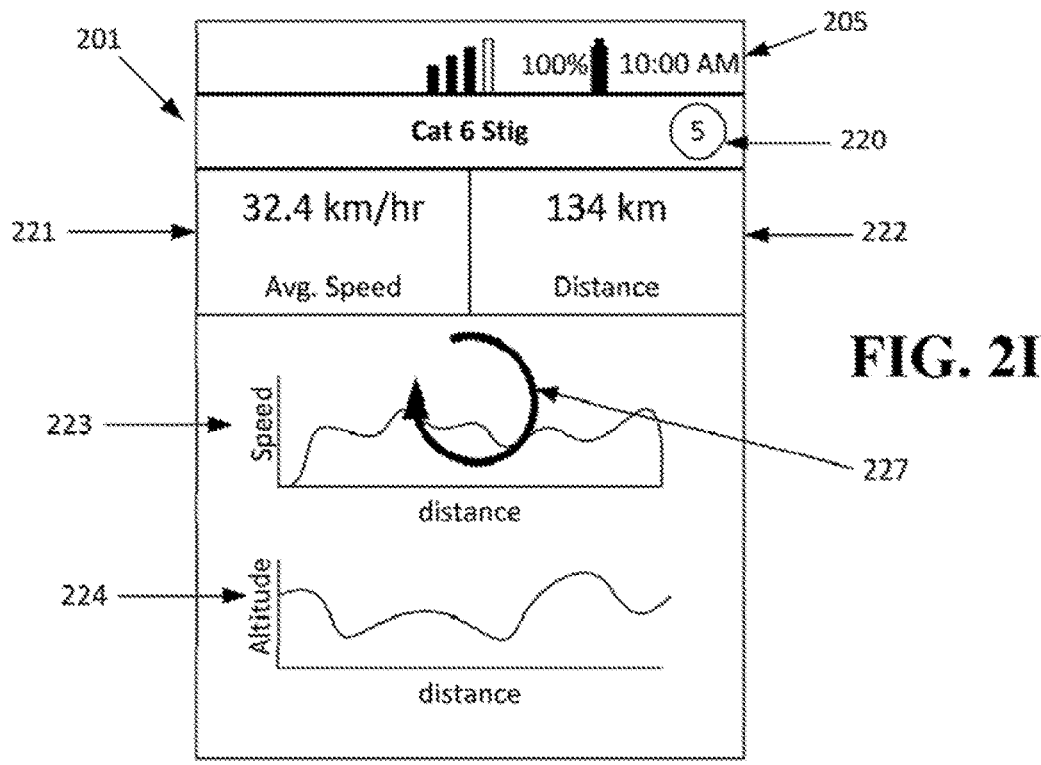
FIG. 2I is an example of a gestural user interface element that can be used to advance or move back the user interface according to an alternative application as disclosed herein.
Figure 2J:
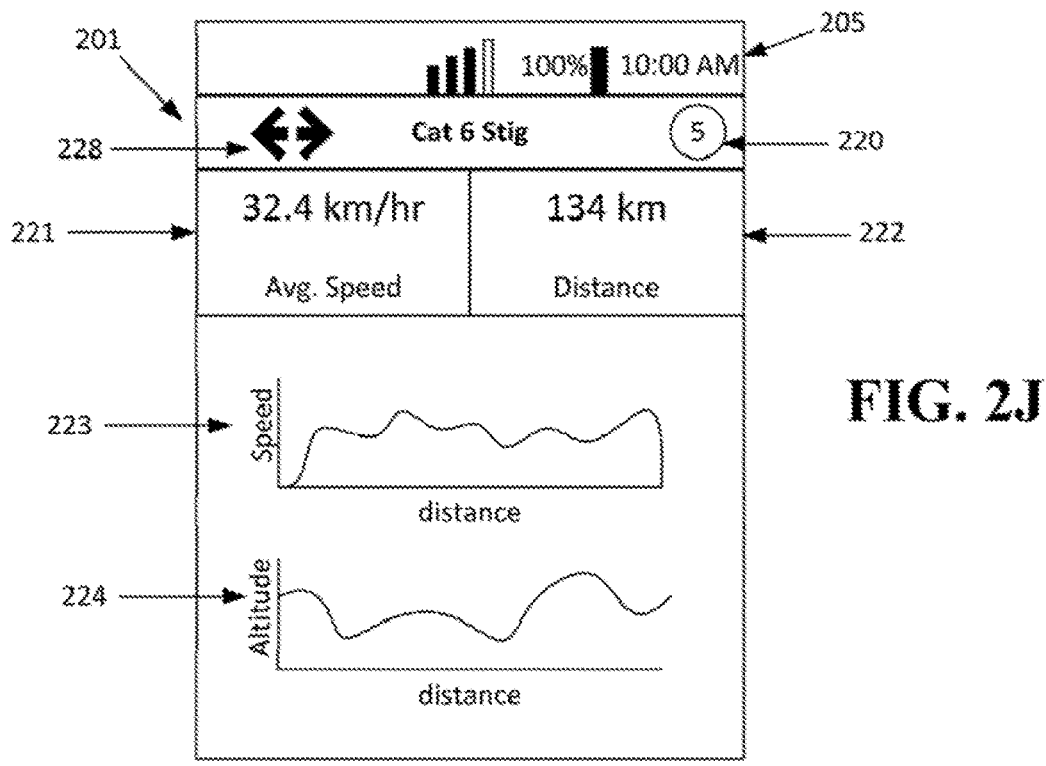
FIG. 2J is an example of a user interface element for navigating the alternative applications and/or the first application via the title bar of a launched application as disclosed herein.

In FIG. 2H, the user may switch between one of the five alternate applications utilizing the forward arrow 226 or the backward arrow 225. The arrows may appear, for example, in response to a long press near the right or left side of the display of the device 201, respectively. For example, if a user selects the forward arrow 226, then the data generated by the first application may be displayed according to the user interface of the next alternative application (e.g., Le Velo). FIG. 2I is an example of a gesture that may be utilized to advance the user interface to the next alternative application. The gesture shown in FIG. 2I is a clockwise circular motion 227. A counter-clockwise circular motion may move the user interface to the previous application. Other gestures, such as a swipe left/right or up/down, may be utilized according to implementations disclosed herein. In some configurations, it may not be necessary for the gesture to contact the display of the client device. For example, a user may make a swipe motion left to advance to the next alternative application available. The swipe motion may be captured by a camera (e.g., an infrared camera) on the client device and may not contact the display of the client device. In FIG. 2J, forward and backward arrows 228 may be displayed in the title bar of the first application (Cat 6 Stig). A user may press on the forward arrow to advance the user interface to the next alternative application. FIG. 2I is an example of an alternative application, Le Velo, which can be evaluated.

Figure 2K:
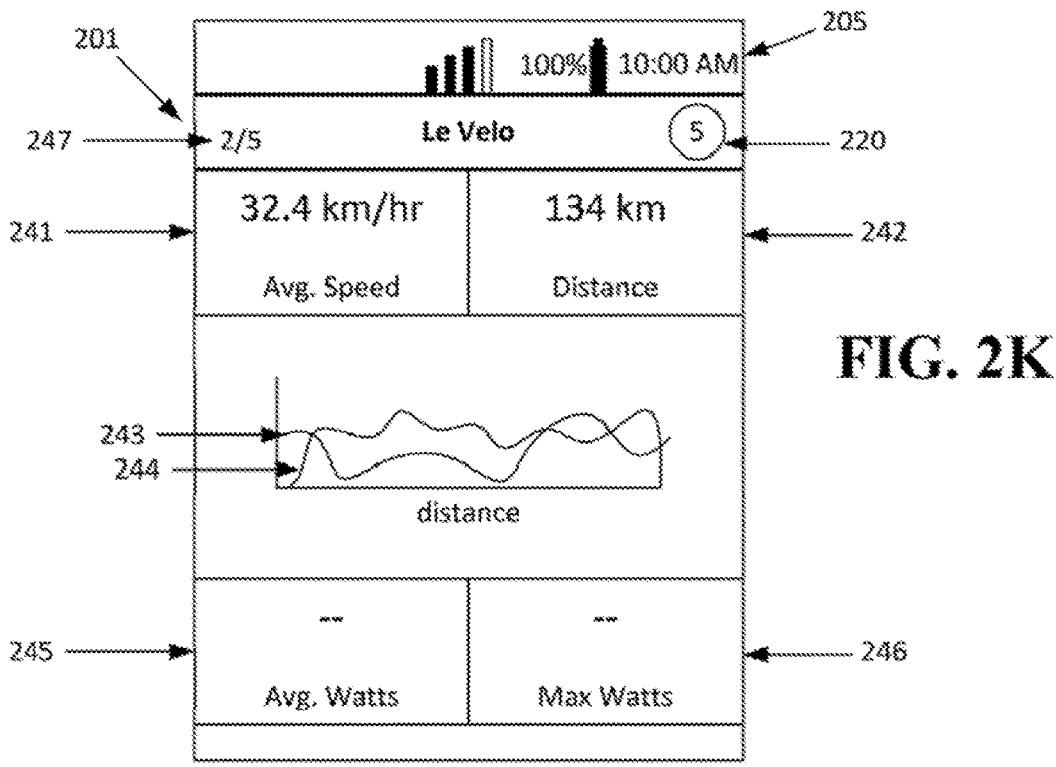
FIG. 2K is an example of an indication of the alternative application the user is currently viewing as a position relative to other alternative applications as disclosed herein.

A user may advance the user interface shown in FIG. 2J for Cat 6 Stig to that shown in FIG. 2K for Le Velo using one of the arrows 228 in the title bar. Because the data generated by Cat 6 Stig is in a format that can be read or imported by Le Velo, the user interface can be seamlessly and/or rapidly moved from one application to the next. Le Velo may, for example, show an average speed 241 and a distance traveled 242 similar to Cat 6 Stig. However, Le Velo may combine the speed graphical representation 243 and the altitude 244 graphical representation into a single chart. Le Velo may include additional user interface elements for the average watts 245 and the maximum watts 246 produced. Because these data are not generated by Cat 6 Stig, there may have been no data to import and the user interface for Le Velo may not display values therefore. FIG. 2K shows an indication of alternative application that the user is viewing at 247. In this example, the indication 247 informs the user that there is one alternative application that the user may have viewed and three additional alternative applications for the user to view. In this regard, the indication 247 may assist a user in navigating through the alternative applications available by displaying a relative position of the launched or active alternative application relative to the other alternative applications and/or the first application. As stated earlier, the user interface elements shown in the examples provided in FIGS. 2A-M are merely non-limiting examples. Other possible user interface elements, locations thereof, and display thereof may be suitable with the implementations disclosed herein.

Figure 2L:
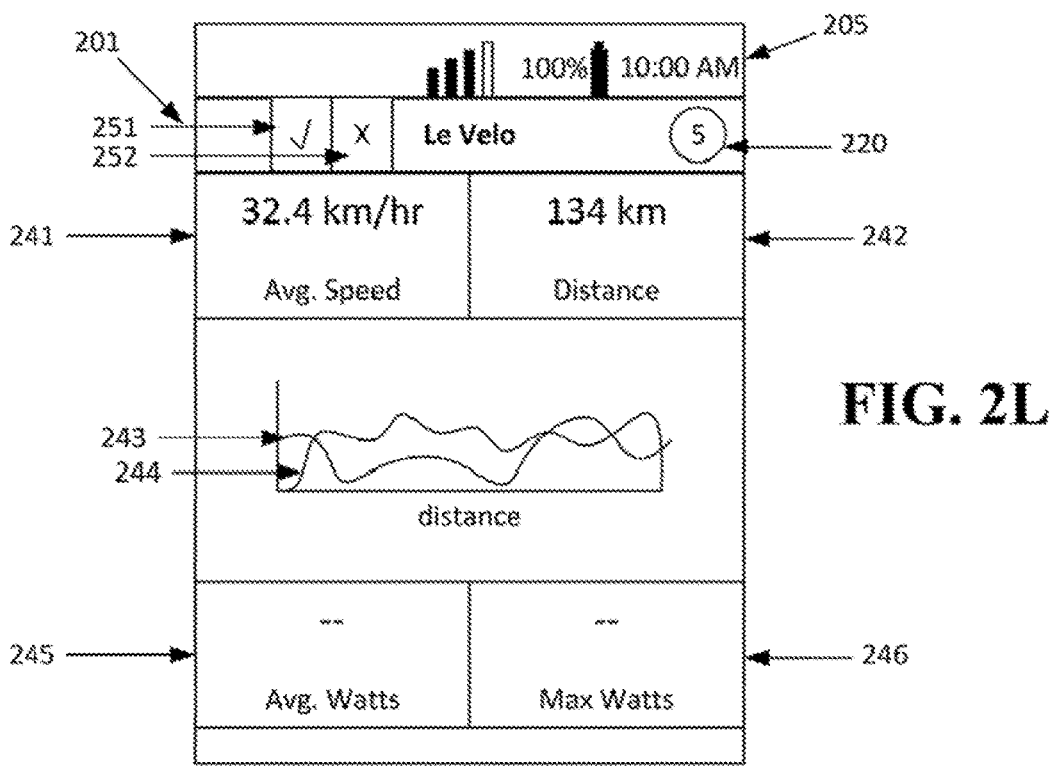
FIG. 2L is an example of a user interface element that can be used to retain/remove one or more of the alternative applications and/or the first application as disclosed herein.

A user may elect to retain and/or remove applications on the fly via a user interface element. FIG. 2L is an example of retaining and/or removing an alternative application. The user interface may display a checkbox 251 for retaining the application and an "X" 252 for removing the application from the client device. Additional options may be displayed for removing all of the alternative applications, for example. In some configurations, when the user elects to retain the alternative application, such as by selecting the checkmark 251 user interface element, then the other alternative applications and the first application (e.g., Application C 204 or Cat 6 Stig in this example) may be removed from the client device.

In some configurations, a user may retain more than one of the alternative applications. In the event that a user elects to retain an alternative application, the client device may move the alternative application from the sandboxed environment (e.g., secure portion of the computer readable storage) and display the retained alternative application similar to other user-installed applications (e.g., like Application A 202 and/or Application B 203). The client device may send the application store an indication that the application has been retained and the application store may associate the retained application with the user's account. The retained application may then be propagated to other devices associated with the user's account.

Figure 2M:
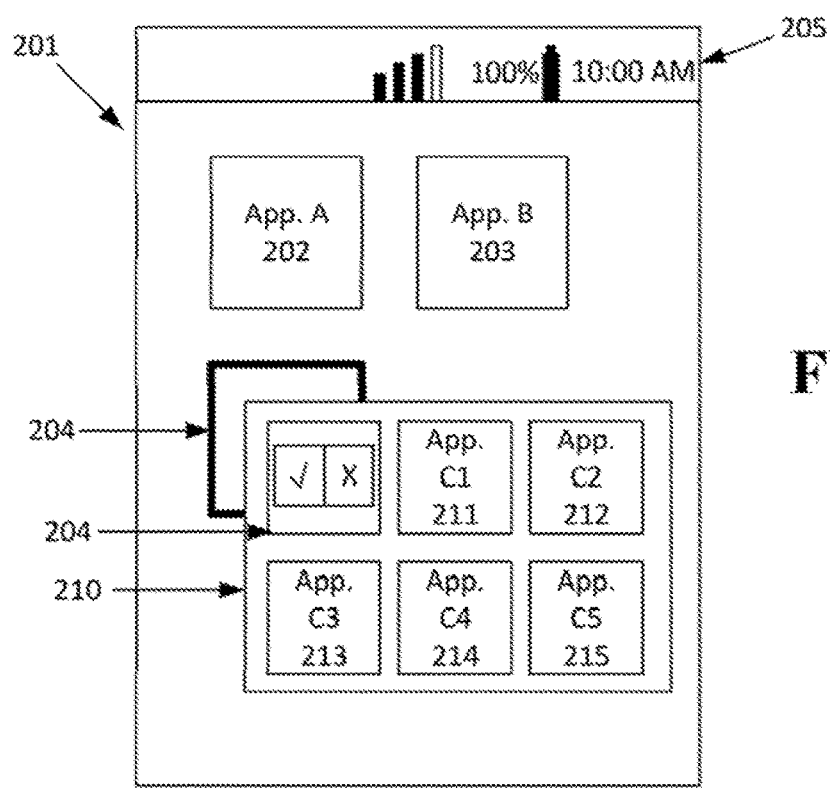
FIG. 2M is an example of a user interface element that can be displayed to retain/remove the first application and/or one or more alternative applications from within another user interface element such as the folder-like display as disclosed herein.

FIG. 2M is an example of retaining or removing one or more of the alternative applications 211, 212, 213, 214, 215 and/or the first application (e.g., App. C 204). A long press on an application may cause the icon representing the application in the folder-like display 210 to rotate 180 degrees and show a checkmark and "X" with which a user may retain or remove an application. Multiple applications may be selected at once. For example, a long press may be performed on multiple applications in the folder 210. A user may select the checkmark or "X" by a tap to indicate a selection for each or two or more applications. When the user closes the folder 210 by, for example, tapping elsewhere on the display, the selected action may be performed by the client device. In some configurations, when multiple actions are selected within the folder (e.g., retaining or removing multiple applications), a second user interface element may be displayed that, when activated, executes the requested actions by the client device. In some configurations, there may be an option to retain all or remove all of the alternative applications. In some configurations, when user opts to retain one or more of the alternative applications and/or the first application, the client device may not require a user request to remove those applications for which no indication was received from the user.

Figure 3:
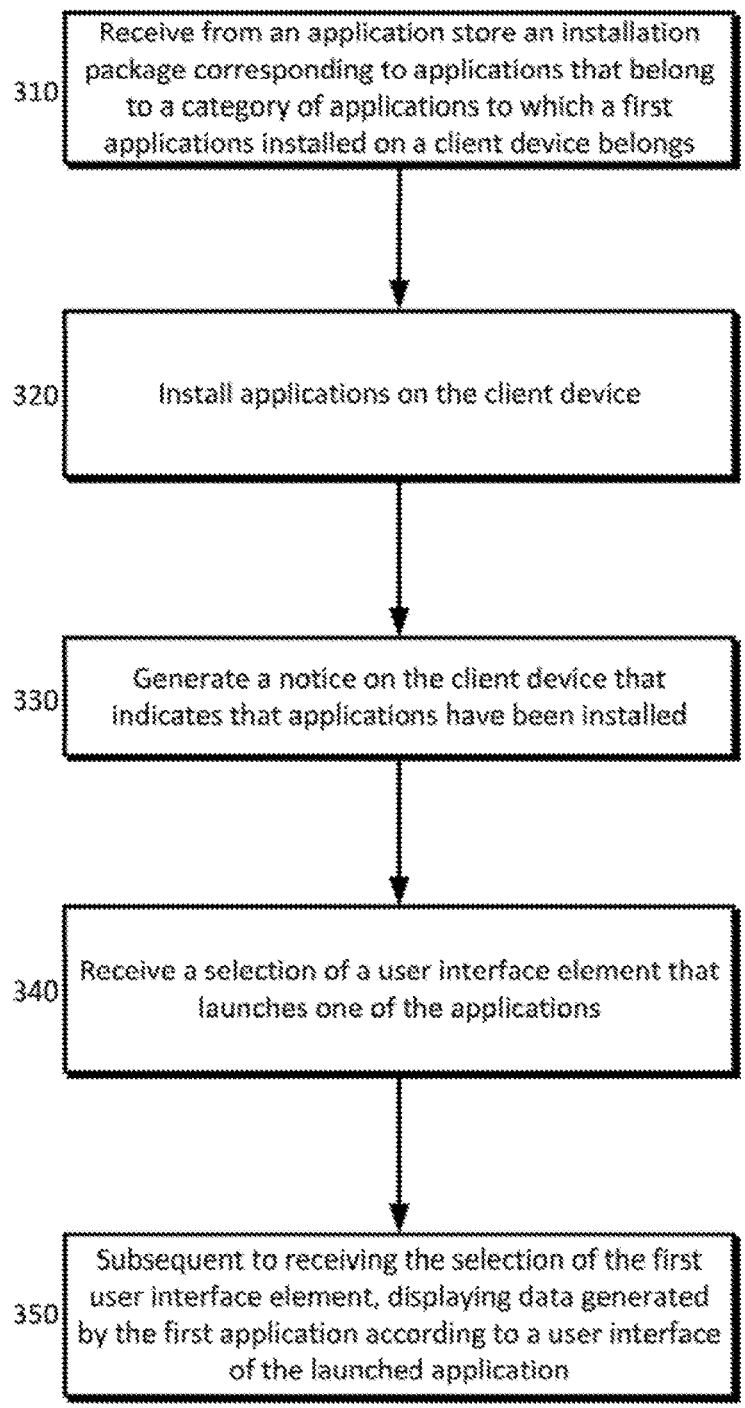
FIG. 3 shows an example of a process performed by a client device to install automatically alternative applications to a first application for which the user requested installation from an application store or the like as disclosed herein.

FIG. 3 is illustrative of a process performed by a client device to automatically install alternative applications to a first application for which the user requested installation from an application store or the like. At 310, one or more installation packages may be received from an application store. The installation packages may correspond to applications that belong to the same category and/or subcategory of applications as a first application that was installed on the client device at the request of the user. The first application may be determined to be a frequently used application as described above.

The client device may install the applications (e.g., alternative applications) using the installation packages obtained from the application store at 320. As described above, the installation of the packages received at 310 may proceed differently compared to a typical installation of a user-requested application via the application store. In a typical installation of an application, the application may be associated with the user's account and propagated to devices associated therewith, be represented by an icon, for example, on a display screen of the user device similar to how applications A and B 202, 203 are represented in FIG. 2A. In contrast, an application automatically installed as shown in FIG. 3, may not be associated with the user account and/or propagated to devices associated therewith. A graphical representation of the application (e.g., an icon) may be associated with a first or primary application and shown in response to a user selecting a user interface element that is associated with the first application (see, e.g., FIG. 2D and FIG. 2E). Further, the application installation process as disclosed in FIG. 3 is not in response to a user request to install the application.

A notice may be generated on the client device that indicates that the alternative applications have been installed at 330. The notice may be associated with the first application as described earlier. Similarly, the notice may be displayed subsequent to successful importation/exportation of data generated by the first application. A selection of a first user interface element may be received by the client device that launches one of the alternative applications or the first application at 340 as described above. Subsequent to selection of the first user interface element, the data imported from the first application may be displayed according to a user interface specified by the launched alternative application 350 as described earlier.

Figure 7:
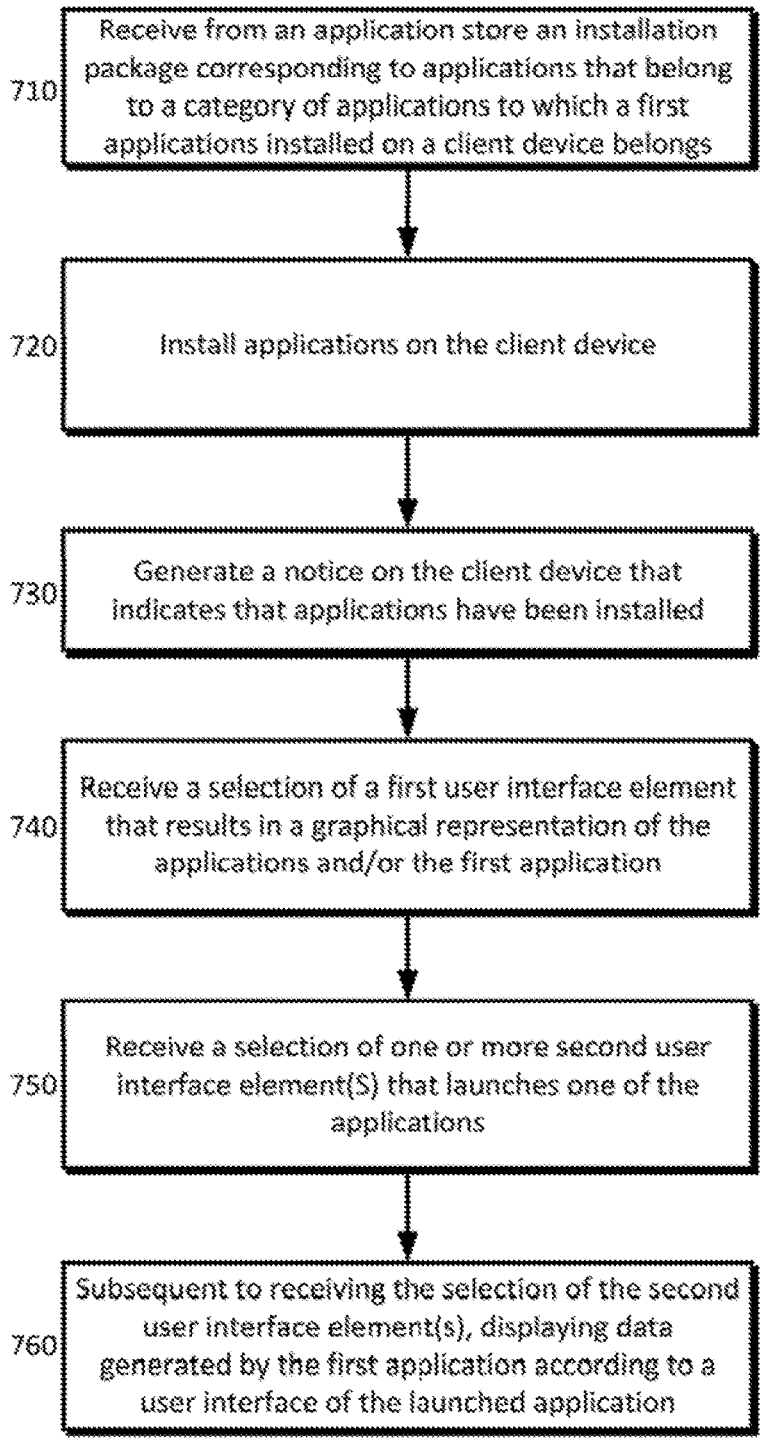
FIG. 7 is an example process for automatically installing alternative applications on a client device through selection of two or more user interface elements as disclosed herein.

In some configurations, the notice may indicate the user that there are alternative applications available and a particular user interface element may be launched responsive to selection or activation of the notice as illustrated by FIG. 7. Installation packages may be received from the application store that correspond to alternative applications for a frequently used application as described above at 710. The alternative applications may be installed on the client device at 720. A notice may be generated on the client device that indicates that applications have been installed at 730. A selection of a first user interface element may be received that causes a graphical representation of the alternative applications and/or the first application to be displayed at 740. A selection of one or more second user interface elements may be received that launches one or more of the alternative applications and/or the first application at 750. Thus, responsive to a selection of a first user interface element, a second user interface element may be displayed.

For example, a user may tap the icon for Application C 204 shown in FIG. 2A. The notice 206 may be a user interface element. The long press of the icon may cause a first user interface element to be displayed such as feature 210 in the example provided in FIG. 2E. Other implementations of the first user interface may be used according to implementations disclosed herein. For example, the first user interface element may be text-based list of the first application and/or the alternative applications. The user may select the first application and/or the alternative applications to be launched using a second user interface element such as the icon displayed for Application C2 212 in FIG. 2E. Selection of the icon may cause the C2 application 212 to be launched on the client device. Returning to FIG. 7, subsequent to the selection of the at least one second user interface element, data generated by the first application may be displayed according to a user interface of at least one of the alternative applications at 760.

In some configurations, a user may identify the alternative applications and/or first application that the user would like to evaluate. For example, when the user long taps an icon displayed in the folder like display 210 of FIG. 2E, the icon may flip over to reveal a checkmark and "X" that can be selected. The user may select one of those two options and perform a likewise operation on the other applications displayed in 210. Similarly, a user may draw circle around those applications shown in 210 that the user would like to evaluate. When one of the selected applications is launched, only the selected applications may be viewed using the data generated from the first application.

In some configurations, the client device may be responsible for determining a frequently used application or a most frequently used one or more applications. An indication of the frequently used or most frequently used one or more applications may be provided to the application store or server connected thereto. The application store may generate the installation packages in response to receiving the indication provided by the client device of the frequently used application(s).

As described earlier, the process illustrated in FIG. 3 or other implementations may not occur without user permission. For example, a user may be prompted when configuring a new client device to indicate whether the user would like to receive alternative application suggestions for frequently used applications on the client device. If the user does not elect to receive the alternative application suggestions, then the system may not perform automatic installation of applications or lite versions thereof. Rather, the user would need to perform a search and individually request installation of applications via the application store. If the user grants permission for the system to provide the alternative application recommendations as disclosed herein, then the application store or client device may periodically determine which applications are frequently used on the client device and select a portion of alternative applications in the same category as at least one of the frequently used applications for installation on the client device as disclosed herein.

In the event one of the alternative applications is a lite version as described earlier, the system, responsive to an indication to retain the lite version of the application, may install the corresponding complete or full version of the application. For example, the user may select one of the alternative applications to be retained that is a lite version. The client device may send a request to the application store for the full version of the application and remove the first application and other alternative applications in response to the use selection.

Figure 4:
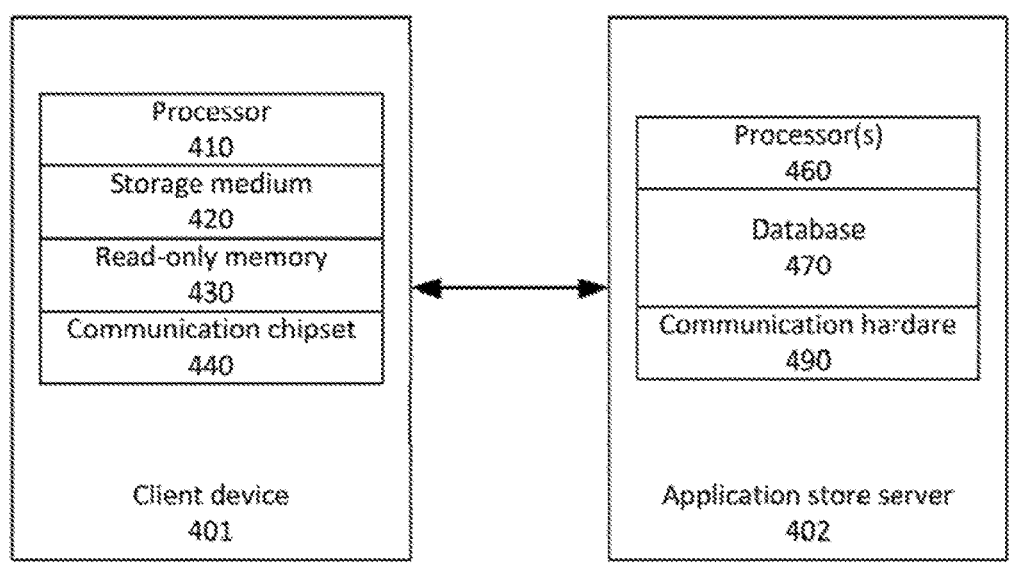
FIG. 4 is an example configuration of hardware on a client device and an application store to install alternative applications on a client device as disclosed herein.

According to an implementation, as illustrated in FIG. 4, a system is provided that may include a client device 401 with a computer readable storage medium 420 and a processor 410 communicatively coupled thereto. The client device may contain a separate read only memory 430 that may store firmware for the device 401 such as manufacturer provided firmware for hardware associated with the device (e.g., a GPS, a camera, the processor 410, an accelerometer, etc.). The client device may include a communication chipset 440 that may be, for example, a wireless radio antenna (e.g., LTE, CDMA, GSM, etc.), a Bluetooth chipset, a near field communication chipset ("NFC"), or a wireless radio antenna (e.g., WLAN). The client device may be in communication with an application store server 402 using the communication chipset 440. The application store 402 may likewise have a communication chipset 490 that may provide for wired (e.g., Ethernet) or wireless communication. The application store 402 may be connected to one or more processors 460 that communicate with a database 470. The database may be distributed across multiple geographic locations and be physically distinct from the processors 460 that handle application installation requests and/or provide the application pages for applications hosted by the application store 402.

The client device 401 may store user data and/or application data on the storage medium 420. Application data may refer to, for example, application usage, the number of activations (e.g., launches per period of time), length of use per period of time or overall, achievement data, purchase history, application progress, data generated by the application, etc. Some or all of the application data may be communicated by the chipset 440 from the client device 401 to the application store 402. The application store 402 may store the application data in the database 470. There may be separate databases for different types of information that are connected to the application store 402. For example, one database may store application data, one database may store user data, one database may store installation packages, etc. User data may refer to demographic data for the user, a browsing history, a purchase history, user purchase data (e.g., a credit card number), etc. User data may also be sent periodically to the application store server 402 and stored in a database 470 connected thereto.

The processor 410 may be configured to receive installation packages corresponding to alternative applications for a first application that is stored on the storage medium 420 of the client device 401. The alternative applications and the first application may belong to the same category and/or subcategory. The alternative applications may be selected, as described above, based on an installation velocity, a user rating, a number of installations, a date the application was published and/or updated, etc. The first application may be a frequently used application as determined by the client device 401 and/or the application store server 402. The alternative applications may be installed on the client device 402 as described earlier. The processor 410 may generate a notice on the client device 401 that indicates that the alternative applications have been installed and/or that the data generated by the first application has been imported into the alternative applications. The notice may be a user interface element that is associated with the first application, for example, as described above.

The processor 410 may receive a selection of a first user interface element that launches one of the alternative applications on the client device 401. Subsequent to the selection of the first user interface element, the processor 410 may display data generated by the first application according to a user interface of the applications. A second user interface element may be displayed or associated with the first application and/or the launched application that, when activated, transforms the user interface from the launched application to a second alternative application as described earlier. Similarly, a user interface element may, when activate, indicate to the client device to retain the alternative application and remove the other alternative applications and the first application. The indication may be communicated to the application store 402 to retrieve a full version of the application in some configurations and/or to associate the selected application with a user account on the application store 402. In some configurations, when a user elects to retain an alternative application, the alternative application's icon may be displayed in the place that was formerly occupied by the first application. For example, if Application C1 211 from FIG. 2E was retained by the user, it may occupy the space of the user interface that is shown for Application C 204 in FIG. 2A (without the notice 206).

Figure 5:
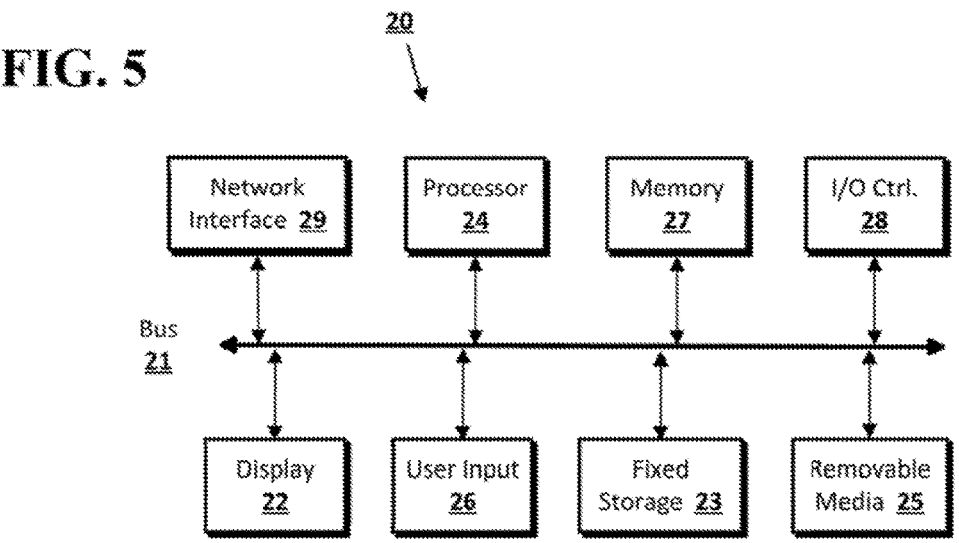
FIG. 5 shows a network configuration according to an implementation of the disclosed subject matter.

Implementations of the presently disclosed subject matter may be implemented in and used with a variety of component and network architectures. FIG. 5 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
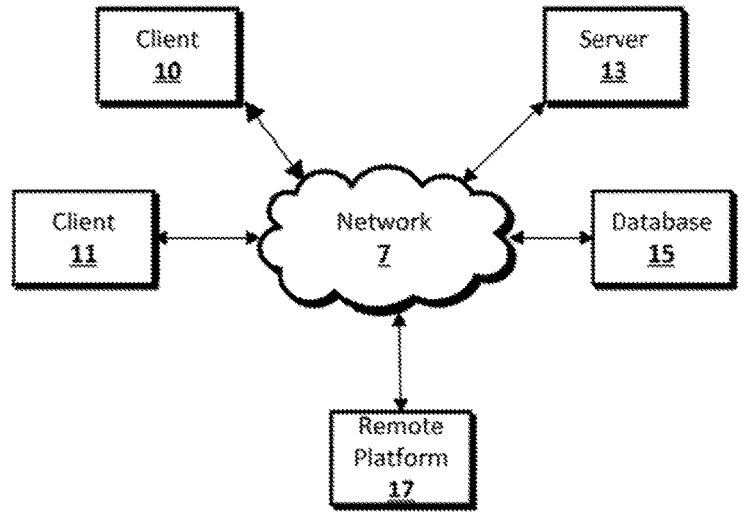
FIG. 6 shows a computer according to an implementation of the disclosed subject matter.

FIG. 6 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive content from the application store and/or to provide data from the client device that may be relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by, for example, the application store.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system, comprising:
a memory configured to store a plurality of applications; and
a processor configured to
determine that a first application, installed on a client device, is a frequently used application on the client device, and
to determine, responsive to a determination that the first application is the frequently used application, that a second application and the first application belong to a category of applications, wherein the second application is above at least one of a threshold level of rating or a threshold level of popularity, wherein data generated by the first application is in a format that is interoperable, based on the category, with the second application and is configured to be imported into the second application, and wherein the format that is interoperable comprises a threshold number of data types used by both the second application and first application.

2. The system of claim 1, wherein the frequently used application ranks in a top thirty percent of applications installed on the client device with respect to a number of launches or an amount of active time.

3. The system of claim 1, wherein the processor is further configured to receive usage data from applications installed on the client device, and wherein the processor is configured to determine that the first application is the frequently used application on the client device by performing a clustering analysis of the usage data.

4. The system of claim 3, wherein the clustering analysis includes at least one of a hierarchical clustering technique, a k-means clustering technique, or a density based clustering technique.

5. The system of claim 1, wherein the processor is further configured to determine that both the second application and the first application have been published on the system within a threshold period of time.

6. The system of claim 5, wherein the processor is further configured to receive, from the client device, a first signal that indicates the threshold period of time.

7. The system of claim 6, wherein the processor is further configured to cause a second signal to be sent to the client device, the second signal configured to cause a user interface of the client device to produce a prompt to enter the threshold period of time.

8. The system of claim 1, wherein the processor is further configured to cause an installation package for the second application to be sent to the client device, the installation package configured to cause the client device to automatically install the second application.

9. The system of claim 8, wherein the processor is further configured to determine an existence of a life version of the second application, and wherein the installation package for the second application comprises an installation package for the lite version of the second application.

10. The system of claim 8, wherein the installation package has a flag set that causes the installation package to install the second application at least one of at a specific time, for a specific retention time, or at a specific location of a computer readable storage medium of the client device.

11. The system of claim 10, wherein the specific location of the computer readable storage medium of the client device is a secure portion of the computer readable storage medium that prevents operations performed by the second application from having access to user data stored on the client device.

12. The system of claim 8, wherein the installation package may be configured to prevent the second application from being downloaded to another device, both the other device and the client device associated with a user account.

13. The system of claim 8, wherein an install a lion of the second application is complete after the data generated by the first application has been imported into the first application.

14. The system of claim 13, wherein the processor is further configured to cause an indication to be provided to the client device after the installation of the second application has been completed.

15. The system of claim 14, wherein the indication is configured to appear in a vicinity of an icon for the first application on a user interface of the client device.

16. The system of claim 8, wherein the installation package has a flag set that causes the second application to use particular elements of a user interface of the client device.

17. The system of claim 8, wherein the installation package is configured to cause a user interface of the client device to display a graphic control element, the graphic control element configured to cause the second application to be at least one of retained or removed.

18. A method, comprising:
   determining, by a processor, that a first application, installed on a client device, is a frequently used application on the client device; and
   determining, by the processor, responsive to a determination that the first application is the frequently used application, that a second application and the first application belong to a category of applications, wherein the second application is above at least one of a threshold level of rating or a threshold level of popularity, wherein data generated by the first application is in a format that is interoperable, based on the category, with the second application and is configured to be imported into the second application, and wherein the format that is interoperable comprises a threshold number of data types used by both the second application and first application.

19. A non-transitory computer-readable medium storing computer code for controlling a processor to cause the processor to:
   determine that a first application, installed on a client device, is a frequently used application on the client device; and
   determine, responsive to a determination that the first application is the frequently used application, that a second application and the first application belong to a category of applications, wherein the second application is above at least one of a threshold level of rating or a threshold level of popularity, wherein data generated by the first application is in a format that is interoperable, based on the category, with the second application and is configured to be imported into the second application, and wherein the format that is interoperable comprises a threshold number of data types used by both the second application and first application.

* * * * *